United States Patent [19]

Umeyama et al.

[11] Patent Number: 4,947,706
[45] Date of Patent: Aug. 14, 1990

[54] FLYWHEEL WITH A TORSIONAL DAMPER

[75] Inventors: Mitsuhiro Umeyama; Hiroshi Itoh; Hiroski Nimura, all of Toyota; Kenichi Yamamoto, Okazaki, all of Japan

[73] Assignee: Toyota Jidosha Kabushiki Kaisha, Toyota, Japan

[21] Appl. No.: 93,573

[22] Filed: Sep. 4, 1987

[30] Foreign Application Priority Data

| | | | |
|---|---|---|---|
| Sep. 5, 1986 | [JP] | Japan | 61-135608[U] |
| Sep. 8, 1986 | [JP] | Japan | 61-136577[U] |
| Sep. 25, 1986 | [JP] | Japan | 61-145869[U] |
| Feb. 23, 1987 | [JP] | Japan | 62-24230[U] |
| May 12, 1987 | [JP] | Japan | 62-69680[U] |
| May 13, 1987 | [JP] | Japan | 62-70151[U] |

[51] Int. Cl.$^5$ .................................. F16F 15/10
[52] U.S. Cl. ........................... 74/574; 192/106.2; 464/68
[58] Field of Search .............. 74/574, 572; 192/106.1, 192/106.2; 464/44, 66, 68

[56] References Cited

U.S. PATENT DOCUMENTS

| | | | |
|---|---|---|---|
| 1,505,480 | 8/1924 | Manville . | |
| 2,042,570 | 6/1936 | Wemp | 74/574 X |
| 2,437,537 | 3/1948 | Kelleher . | |
| 2,729,079 | 2/1955 | Kuehn . | |
| 3,266,271 | 8/1966 | Stromberg . | |
| 3,514,974 | 6/1970 | Adachi | 74/574 X |
| 4,093,054 | 6/1978 | Johns | 192/106.1 |
| 4,274,524 | 6/1981 | Nakane | 192/48.3 |
| 4,351,168 | 9/1982 | Prince et al. | 464/64 |
| 4,445,876 | 5/1984 | Entrup | 464/48 |
| 4,468,207 | 8/1984 | Yoshida | 464/81 X |
| 4,485,909 | 12/1984 | Gatewood . | |
| 4,601,677 | 7/1986 | Takeuchi | 192/106.1 |
| 4,618,048 | 10/1986 | Kobayashi . | |
| 4,645,054 | 2/1987 | Raab | 464/68 X |
| 4,662,239 | 5/1987 | Worner et al. | 74/574 |
| 4,663,983 | 5/1987 | Kobayashi et al. . | |
| 4,698,045 | 10/1987 | Billet et al. | 192/106.2 X |
| 4,714,449 | 12/1987 | Woerner et al. . | |
| 4,724,719 | 2/1988 | Werner et al. . | |
| 4,727,767 | 3/1988 | Aiki et al. | 192/106.2 X |
| 4,747,800 | 5/1988 | Takeuchi | 192/106.2 X |
| 4,747,801 | 5/1988 | Chasseguet et al. | 464/66 |
| 4,748,868 | 6/1988 | Kobayashi et al. | 74/574 |
| 4,760,754 | 8/1988 | Friedmann . | |
| 4,777,843 | 10/1988 | Bopp | 74/574 |

FOREIGN PATENT DOCUMENTS

| | | |
|---|---|---|
| 259173 | 3/1988 | European Pat. Off. . |
| 2926012 | 10/1980 | Fed. Rep. of Germany . |
| 3410953 | 5/1985 | Fed. Rep. of Germany . |
| 3506818 | 9/1985 | Fed. Rep. of Germany . |
| 3627784 | 7/1987 | Fed. Rep. of Germany . |
| 3642877 | 7/1987 | Fed. Rep. of Germany . |
| 2571461 | 4/1986 | France . |
| 2593252 | 7/1987 | France . |
| 2000257 | 1/1979 | United Kingdom . |
| 2103760 | 2/1983 | United Kingdom . |
| 2109085 | 5/1983 | United Kingdom ............ 74/572 |
| 2141209 | 12/1984 | United Kingdom ............ 74/572 |
| 2157801 | 10/1985 | United Kingdom . |
| 2160296 | 12/1985 | United Kingdom ......... 192/106.2 |
| 2163524 | 2/1986 | United Kingdom . |
| 2171174 | 8/1986 | United Kingdom . |
| 2180322 | 3/1987 | United Kingdom . |
| 2186344 | 8/1987 | United Kingdom . |

OTHER PUBLICATIONS

Automotive Engineering, vol. 93, No. 1, Jan. 1985, p. 85, Dallas, Tex., U.S. : J. Yamaguchi: "Flywheel Damper Reduce Low Speed Diesel Noise and Vibrations".

*Primary Examiner*—Rodney M. Lindsey
*Attorney, Agent, or Firm*—Cushman, Darby & Cushman

[57] ABSTRACT

A flywheel with a torsional damper having two kinds of spring mechanisms, one spring mechanism directly connecting driving and driven side flywheels and the other spring mechanism connecting the driviing and driven side flywheels via a friction mechanism. By this arrangement, the flywheel has two vibrational characteristics between which vibrational operation of the flywheel can shift depending on whether the friction mechanism slides. The flywheel can pass through its resonance speed by shifting its operation from one vibrational characteristic to the other without being accompanied by a large amplification of vibration. In addition, since sliding at the friction mechanism occurs only briefly, a good damping effect can be obtained at the usual range of engine operating speeds unlike a prior art flywheel with a continuously sliding hysteresis mechanism.

26 Claims, 19 Drawing Sheets

P : SLIDE INITIATING POINT OF FRICTION MECHANISM
Q : OPERATION INITIATING POINT OF STOPPER MECHANISM

FLYWHEEL WITH A TORSIONAL DAMPER

BACKGROUND OF THE INVENTION

1. Field of the Invention:

The present invention relates to flywheels. More particularly this invention relates to flywheels that can change vibrational behaviors, thereby suppressing resonance.

2. Description of the Related Art:

Flywheels which comprise means defining two inertia moments (driving and driven side flywheels), a spring mechanism for connecting the two inertia moment defining means and a friction mechanism are well-known, as demonstrated by U.S. Pat. No. 4,468,207, U.S. Pat. No. 4,274,524, U.S. Pat. No. 4,351,168, U.S. Pat. No. 2,042,570 U.S. Pat. No. 4,445,876, U.S. Pat. No. 2,729,079, U.S. Pat. No. 2,437,537, DE-A-2,926,012, Automotive Enginnering, vol. 93, page 85, etcetera.

The prior art flywheels have a single kind of vibrational characteristic produced by a single kind of spring mechanism, even though the single kind of spring mechanism may comprise a plurality of coil springs provided in series or in parallel with each other. The single vibrational characteristic causes the flywheel to have a single first mode resonance speed through all engine speeds. The resonance speed is usually set lower than the idling speed of the engine. As a result, when the engine speed passes through the resonance speed during a start-up or stop operation, torsional vibrations of the flywheel are amplified. To suppress the amplification in the torsional vibrations to a low level, a continuously sliding friction mechanism (a hysteresis mechanism) which slides through the entire range of the engine speeds is disposed between the two inertia moment defining means However, there are the following two deficiencies in the prior art flywheels. One deficiency is that a considerably large resonance remains at the resonance speed even if the friction mechanism is provided, because the characteristic of the flywheel is determined mainly by the spring mechanism and less by the friction mechanism The other deficiency is that the friction mechanism deteriorates the acceleration transmitting rate (which corresponds to a damping characteristic of the flywheel) in the standard range of engine speeds above the idling speed, because the continuously operates over the entire range of engine speeds and because temporary sticking often occurs in the friction mechanism.

SUMMARY OF THE INVENTION

A first and essential object of the present invention is to provide a basic flywheel with two vibrational characteristics different from each other so that the vibrational behavior of the system can shift from one characteristic to the other using a temporarily sliding friction mechanism when the rotational speeds approach the resonance speed of the one characteristic. This invention suppresses resonance of the flywheel by the shift of operation and improves the acceleration transmittance rate characteristic by eliminating the continuous friction force due to the continuously sliding friction mechanism of the prior art.

Other objects of the present invention described below relate to improvements for the above basic flywheel and therefore are preferable objects.

A second object is to provide means for restricting sliding in the friction mechanism when a torsional angle, induced between driving and driven side flywheels of the basic flywheel, exceeds a predetermined specified value, thereby increasing the torque transmitting capacity of the flywheel despite the temporarily sliding friction mechanism.

A third object is to provide means for preventing a metal-to-metal sliding contact between members of the flywheel which may cause sticking between the members and wear of the members, thereby improving a dam effect of the flywheel.

A fourth object is to provide mean increasing the torque transmitting capacity of the flywheel without affecting the good damping characteristic of the basic flywheel in a moderate torque transmitting range.

A fifth object is to provide means for making the friction mechanism slide at a constant pre-determined specified torsional angle despite a variance of a specified friction force of the friction mechanism due to wear of an abrasive material used for the friction mechanism, thereby increasing operational reliability of the flywheel A sixth object is to provide means for optimizing torque distribution on the torque transmittingmembers of the flywheel, thereby improving the strength of the flywheel.

The above-described first object is achieved by a vibrational system for a flywheel with a torsional damper defined in the following item (i-a) or a flywheel with a torsional damper defined in the following item (i-b) Also, the above-described second through sixth objects are achieved by flywheels defined in the following items (ii) to (vi) in accordance with the present invention.

(i-a) A vibrational system for a flywheel with a torsional damper comprising:

two means defining inertia moments;

a first spring mechanism directly connecting the two inertia moment defining means;

a second spring mechanism; and a friction mechanism, the friction mechanism being provided in series with the second spring mechanism, the series combination of the second spring mechanism and the friction mechanism being arranged parallel to the first spring mechanism between the two inertia moment defining means.

(i-b) A flywheel with a torsional damper comprising:

a driving side flywheel and a driven side flywheel which have a common rotational axis and can rotate relative to each other; and a first spring mechanism directly connecting the driving and driven side flywheels;

a second spring mechanism;

a friction mechanism which is provided, in a meaning of a vibrational system, in series to the second spring mechanism, the series combination of the second spring mechanism and the friction mechanism being arranged, in a meaning of a vibrational system, parallel to the first spring mechanism between the driving and driven side flywheels.

The details of items (i-a) and (i-b) will be explained in the first embodiment hereinafter.

(ii) A flywheel according to item (i-b), further comprising a first control plate provided rotatable relative to the driving and driven side flywheels and provided between the second spring mechanism and the friction mechanism for connecting the second spring mechanism and the friction mechanism and a stopper mechanism provided between the first control plate and the driven side flywheel for preventing a torsional angle induced between the first control plate and the driven side flywheel from the exceeding a pre-determined specified value.

The details of item (ii) will be explained in the second embodiment hereinafter.

(iii) A flywheel according to item (i-b), wherein the driving side flywheel comprises an outer ring, the driven side flywheel comprises a driven plate, the first spring mechanism comprises a plurality of first coil springs and spring seats located at both ends of each of the first coil springs, and the flywheel further comprises a second control plate rotatable relative to the driving and driven side flywheels, the plurality of first coil springs being connected via the second control plate and wherein the following relationships hold between clearances SA, SB and SC:

$0 < SA < SB$; and
$0 < SA < SC$;

where, SA is a clearance defined between the outer ring and the spring seat, SB is a clearance defined between the second control plate and the driven plate, and SC is a clearance defined between the second control plate and the outer ring.

The details of item (iii) will be explained in the third embodiment hereinafter.

(iv) A flywheel according to item (i-b), further comprising a third spring mechanism which operates when a torsional angle induced between the driving and driven side flywheels exceeds a predetermined specified value.

The details of item (iv) will be explained in the fourth embodiment hereinafter.

(v) A flywheel according to item (i-b), wherein the second spring mechanism comprises a second coil spring and spring seats located at both ends of the second coil spring, each spring seat including a hard portion and at-least one of the spring seats including a rubber cushion, and the spring seats disposed at both ends of the second coil spring are brought into contact with each other when a force acting on the friction mechanism due to a deformation of the second coil spring reaches the predetermined specified friction force of the friction mechanism at the rubber cushion, thereby causing a sliding of the friction mechanism.

The details of item (v) will be explained in the fifth embodiment hereinafter.

(vi) A flywheel according to item (ii), wherein the driven side flywheel comprises a driven plate, a first control plate is provided between the second spring mechanism and the friction mechanism, and a torque load caused after the sliding of the friction mechanism is restricted by the stopper mechanism is distributed to the driven plate and the first control plate in proportion to respective strengths of the driven plate and the first control plate.

The details of item (vi) will be explained in the sixth embodiment hereinafter.

The flywheel according to item (i-a) or item (i-b) operates in the following way and the operation is also applicable to the flywheels having the improvements according to items (ii) to (vi).

The vibrational system according to item (i-a) or the flywheel according to item (i-b) has two vibrational characteristics, that is, a $K+K_1$ characteristic and a K characteristic which will be illustrated below.

The $K+K_1$ characteristic is a charactaristic of the system comprising (a) the two inertia moment defining means comprising the driving and driven side flywheels and (b) a synthetic spring mechanism having a synthetic spring constant $K+K_1$ which comprises (b-1) the first spring mechanism having a synthetic spring constant K and (b-2) the second spring mechanism having a synthetic spring constant $K_1$. The $K+K_1$ characteristic is produced when the friction mechanism is not sliding, that is, when a force (F) acting on the friction mechanism due to a deformation of the second spring mechanism is smaller than a pre-determined specified friction force (Fr) of the friction mechanism. The system operates according to the $K+K_1$ characteristic when the engine speed is within a usual operating range or a very low speed range.

The K characteristic is a characteristic of the system comprising (a) the two inertia moment defining means and (b) the first spring mechanism having a spring constant K. The K characteristic is produced when the friction mechanism is sliding, that is, when a torsional angle induced between the driving and driven side flywheel becomes large and, at last, a friction force (F) acting at the friction mechanism due to a deformation of the second ($K_1$) spring mechanism reaches and exceeds the pre-determined specified friction force (Fr). Such a state occurs when the system which has been operating according to the $K+K_1$ characteristic approaches the resonance speed of the $K+K_1$ characteristic during a start-up or stop operation of the engine or when torques acting on the system are very large.

During a start-up or stop operation of the engine, when the rotational speed of the system approaches the resonance speed of the $K+K_1$ characteristic and a force acting on the friction mechanism due to a deformation of the second spring mechanism gradually increases and at last reaches the specified friction force (Fr) of the friction mechanism, the friction mechanism begins to slip, causing the system to shift its operation from the $K+K_1$ characteristic to the K characteristic, because the sliding of the sliding mechanism makes the second spring ineffective. Since the resonance speed of the K characteristic is set different from that of the $K+K_1$ characteristic, the system which just shifted to the K characteristic jumps over the resonance speed the $K+K_1$ characteristic and therefore, the system passe through the resonance speed of the $K+K_1$ characteristic without resonances being amplified to a great extent. When the speed of the system changes away from the resonance speed of the $K+K_1$ characteristic, i.e., the engine speed increases or decreases, the rotational speed variances of the flywheel naturally decrease. As a result, a force acting on the friction mechanism becomes small, the sliding of the friction mechanism will cease, and the system again operates according to the $K+K_1$ characteristic.

This means that the system or the flywheel according to the present invention does not have a notable resonance speed over the entire range of engine speeds and that the resonance of the system is decreased to a very low level in comparison with the prior art. Also, it should be noted that, in the flywheel of the present invention, a friction force due to a sliding at the friction acts momentarily only when the speed of the system passes through, the resonance speed of the $K+K_1$ characteristic and that at normally used engine speeds, any friction force due to a sliding at the friction mechanism does not act in the system. This can improve an acceleration transmittance rate of the flywheel and improve a damping effect of the flywheel.

BRIEF DESCRIPTION OF THE DRAWINGS

The above and other objects, features and advantages of the present invention will apparent and will be more readily appreciated from the detailed description of the preferred exemplary embodiments of the invention taken in conjunction with the drawings, in which.

DETAILED DESCRIPTION OF THE PREFERRED

Figure 16:
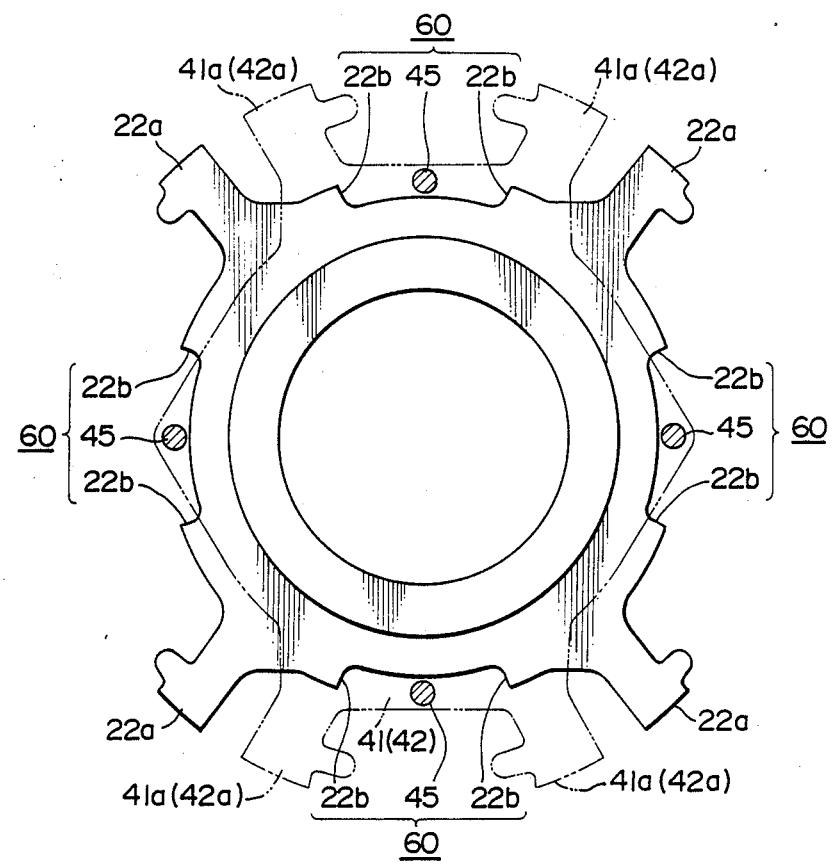
FIG. 16 is an elavational view of a driven plate and a first control plate illustrating how a stopper mechanism is provided in accordance with the second embodiment of the present invention.
Figure 17:
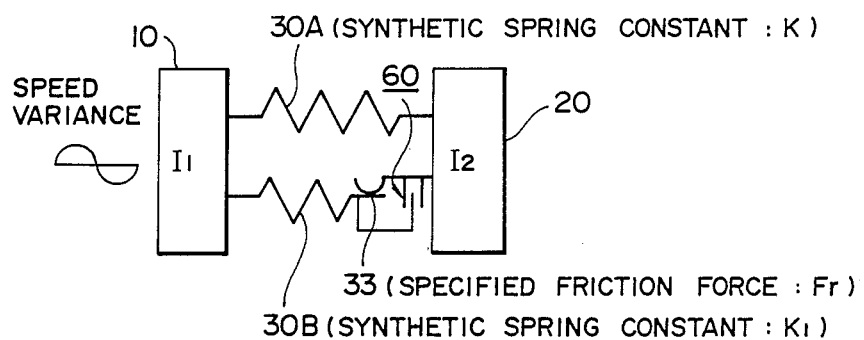
FIG. 17 is a system diagram to the second embodiment illustrating how the stopper mechanism is arranged.
Figure 18:
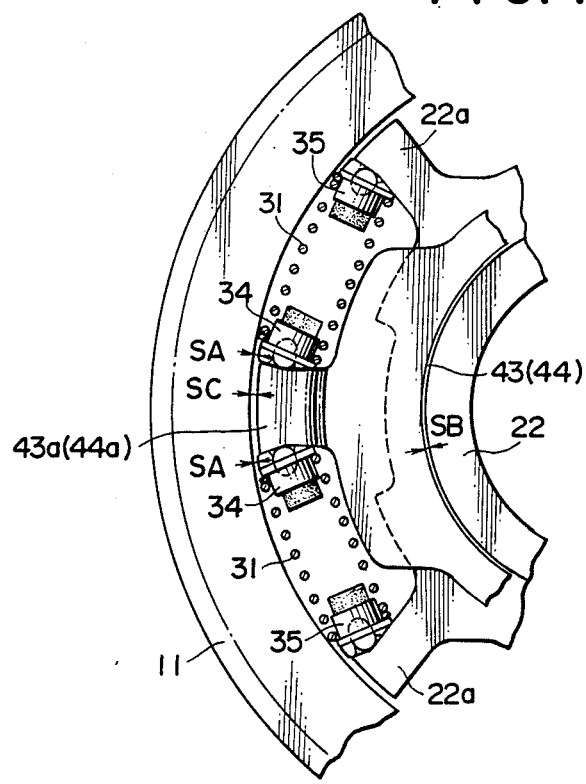
FIG. 18 is a partial elevational view according to the third embodiment of the present invention illustrating clearance relationships among a spring seat of first spring mechanism, a driven plate of a driven side flywheel, a second control plate and an outer ring of a driving side flywheel.
Figure 19:
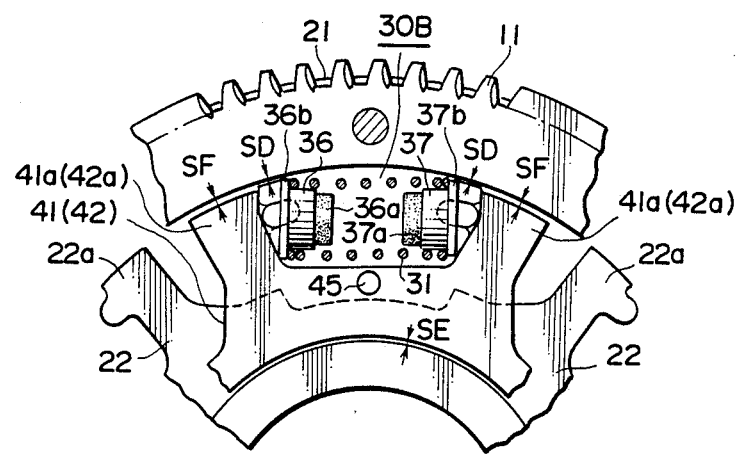
FIG. 19 is a partial elevational view according to the third embodiment of the present invention illustrating clearance relationships among a spring seat of a second spring mechanism, the driven plate of the driven side flywheel, a first control plate and the outer ring of the driving side flywheel.
Figure 30:
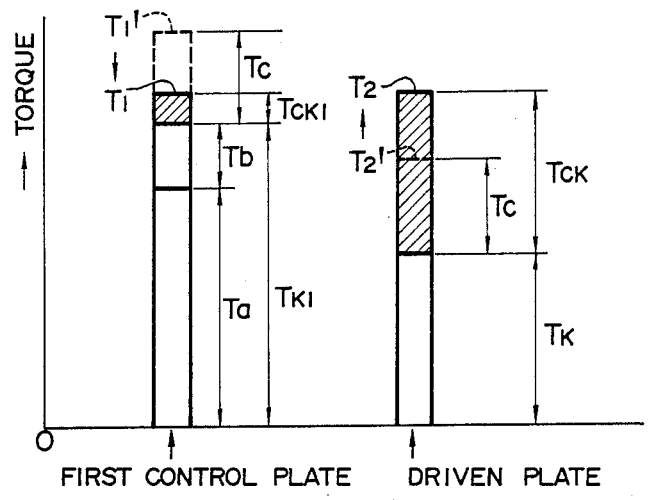
FIG. 30 is a diagram illustrating a torque distribution onto a first control plate and a driven plate of a flywheel according to a sixth embodiment of the present invention in which a torque distribution onto the first control plate and the driven plate in accordance with the first embodiment is also shown for comparison.
Figure 31:
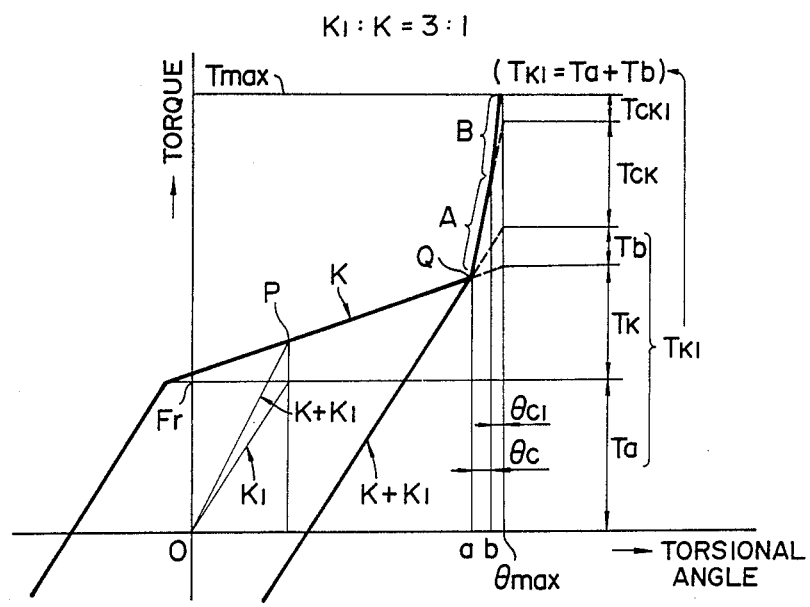
FIG. 31 is a diagram illustrating a torsional angle-torque characteristic according to the sixth embodiment of the present invention.

FIGS. 1 through 15 illustrate a first embodiment of the present invention for achieving the first object of the present invention. The explanations about the first embodiment are applicable to other embodiments of the present invention. FIGS. 16 and 17 illustrate a second embodiment for achieving the second object; FIGS. 18 and 19 illustrate a third embodiment for achieving the object; FIGS. 20 to 23 illustrate a fourth embodiment for achieving the fourth object; FIGS. 24 to 29 illustrate a fifth embodiment for achieving the fifth object; and FIGS. 30 and 31 illustrate a sixth embodiment for achieving the sixth object.

Figure 3:
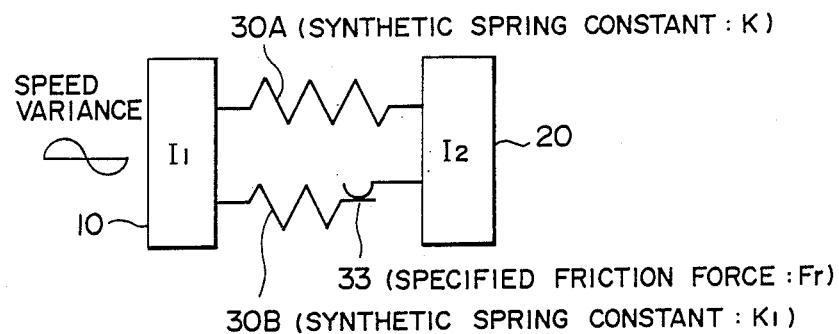
FIG. 3 is a system diagram illustrating a vibrational system of the flywheel according to the first embodiment of the present invention.

At first, the first embodiment will be explained. FIG. 3 illustrates a basic vibrational system for a flywheel with a torsional damper in accordance with the present invention. The system comprises two means defining inertia moments $I_1$ and $I_2$ which comprise driving and driven side flywheels, respectively, and two kinds of spring mechanisms, that is, a first spring mechanism 30A having a synthetic spring constant K and a second spring mechanism 30B having a synthetic spring constant $K_1$. In this instance, a ratio of $K_1/K$ is preferable to be set at 3-4. First spring mechanism 30A having the synthetic spring constant K directly connects the two inertia moments $I_1$ and $I_2$ and second spring mechanism 30B having the synthetic spring constant $K_1$ connects the two inertia moments $I_1$ and $I_2$ via a friction mechanism 33 having a predetermined specified friction force Fr which is provided in series to second spring mechanism 30B. The specified friction force Fr is the fT at which the friction mechanism 33 begins sliding. The series combination of second spring mechanism 30B and friction mechanism 33 is arranged parallel to first spring mechanism 30A. Due to this arrangement, the system has two vibrational characteristics comprising a $K+K_1$ characteristic and a K characteristic which were already described and, as a result, the system can shift its operation between the two characteristics. Such shift is not seen in and prior art flywheel.

Figure 4:
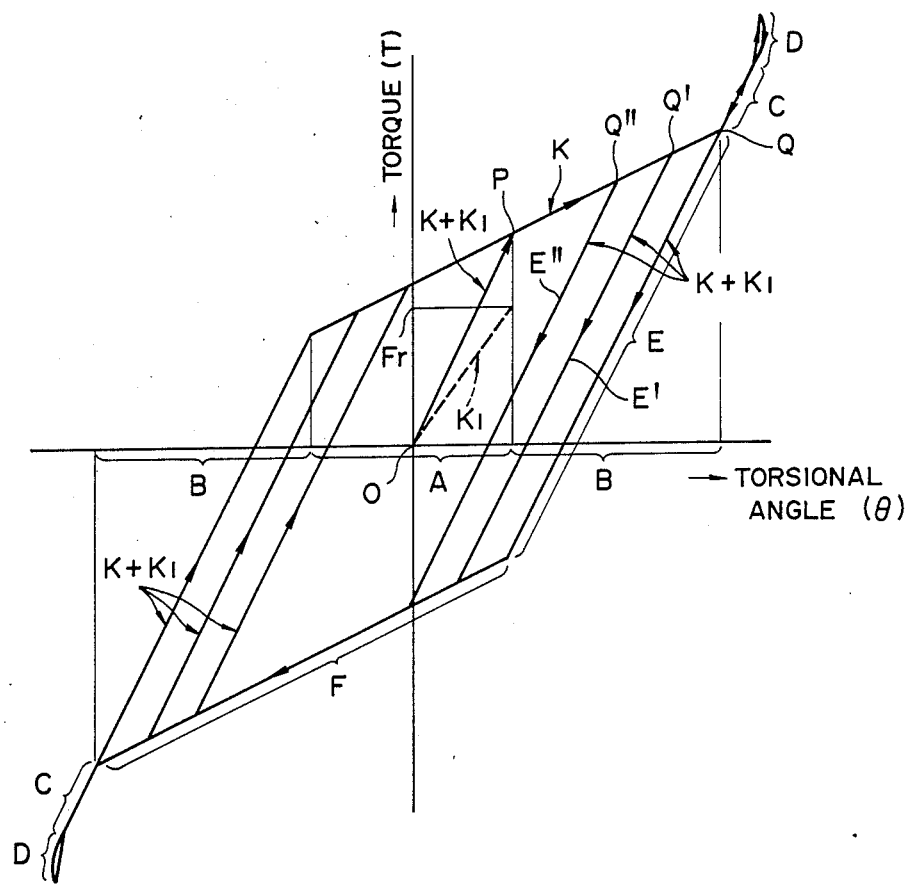
FIG. 4 is a diagram illustrating a torsional angle-torque characteristic of the flywheel according to the first embodiment of the present invention.
Figure 5:
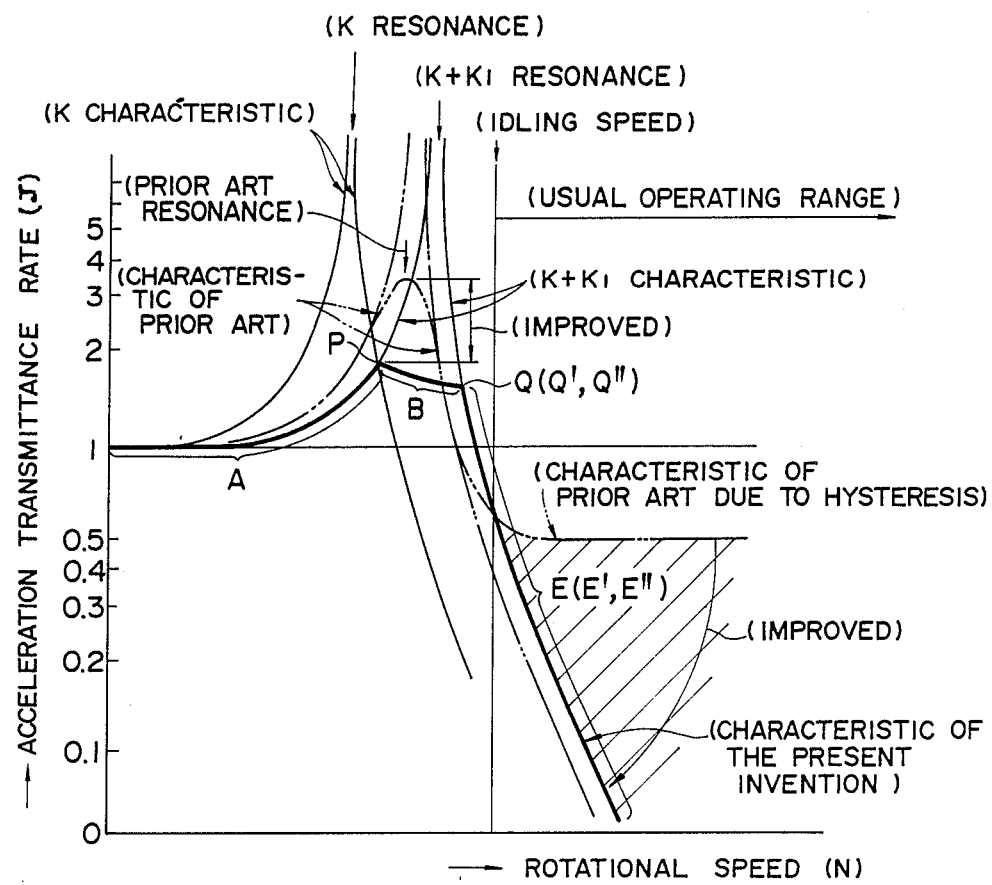
FIG. 5 is a graph illustrating a rotational speed-acceleration transmittance rate characteristic of the flywheel according to the first embodiment of the present invention.

FIGS. 4 and 5 illustrate the operational characteristics which are obtained in the vibrational system of FIG. 3. In more detail, FIG. 4 illustrates a relationship existing between a transmitted torque T and a torsional angle $\theta$ induced between the two inertia moment defining means $I_1$ and $I_2$ comprising the driving and driven side flywheels. Also, FIG. 5 illustrates a relationship existing between engine speeds N and an acceleration transmittance rate J. It is preferable that the acceleration transmittance rate be as small as possible, because torque variances are effectively damped.

In FIG. 5, when engine speeds are in the usual operating range E or are in a very low speed A where a torque acting on the flywheel is usually small, a deformation of second spring mechanism 30B the synthetic spring constant $K_1$ is small and a force F acting friction mechanism 33 is small. As a result, friction mechanism 33 does not slide and accordingly both second spring mechanism 30B having a synthetic spring constant $K_1$ and first spring mechanism 30A operate. Thus, the system operates according to the $K+K_1$ characteristic at the ranges A and E in FIG. 4 and also operates according to the $K+K_1$ characteristic at the ranges A and E in FIG. 5

However, during a start-up or stop operation of the engine, the engine speed will pass through the resonance speed of the $K+K_1$ characteristic in FIG. 5. When the engine speed approaches the resonance speed of the $K+k_1$ characteristic along the $K+K_1$ characteristic in FIG. 5, the torsional angle induced between the driving and driven side flywheels becomes gradually large, being accompanied by an increase in the deformation of second spring mechanism 30B having the synthetic spring constant $K_1$ and also with an increase in the force acting on friction mechanism 33. When the increasing friction force F reaches at last the predetermined specified friction force Fr in FIG. 4, friction mechanism 33 begins to slide and second spring mechanism 30B becomes ineffective due to the sliding of friction mechanism 33. At the same time, the system shifts its operation from the $K+K_1$ characteristic to the K characteristic through the curve B of FIG. 5 (from a point P to a point Q during a start-up operation of the engine and from point Q to point P during a stop operation of the engine) and the system operates in a range B of FIG. 4. In range B, a Coulomb damper due to the sliding of friction mechanism 33 is operating. Since the resonance speed of the K characteristic differs from the resonance speed of the $K+K_1$ characteristic toward lower speeds as shown in FIG. 5, the system having shifted to the K characteristic jumps over the resonance speed of $K+K_1$ characteristic as shown in FIG. 5. Then, when the engine speed changes away from the resonance speed of the $K+K_1$ characteristic in FIG. 5 so as to enter the standard speed range E or to enter the very low speed range A of FIG. 5, torsional angles which are induced between the driving and driven side flywheels become rapidly small in not large rotational cycles and a deformation of second spring mechanism 30B becomes small, whereby friction mechanism 33 ceases its sliding and the system operates again according to the $K+K_1$ characteristic. In the above operation, the friction mechanism 33 slides only when the system shifts its operation and usually it does not slide in the ranges E and A of FIG. 5.

FIG. 5 illustrates the effects obtained by the present invention in comparison with those of prior art, that is, a decrease in the acceleration transmittance rate when the speed of the systems passes through resonance speed of the system and when the speed of the is in the usual operating range E. The former effect is obtained by the operational shifting through the curve B of FIG. 5 between the two vibrational characteristics and the latter effect is obtained by the non-sliding at friction mechanism 33 in the range E of FIG. 5.

In FIG. 4, point P denotes a point where friction mechanism 33 begins to slide; point Q denotes the maximum of the points where sliding of friction mechanism 33 stops; path E denotes a path along which the system operates after the stop of sliding; point Q' and Q" denote tosional angles produced when a large torque is imposed on the system; and paths E' and E" denote paths along which the system operates after sliding steps. Also in FIG. 5, points P and Q denote initiating and end points of sliding, respectively; points Q' and Q" denote initiating and end points of sliding, respectively, after the torsional angles Q' and Q" of FIG. 4 are induced; and range A, E, E' and E" denote ranges where friction mechanism 33 does cause sliding.

Next, the detailed structure of the flywheel in accordance with the first embodiment of the present invention for realizing the system of FIG. 3 will be illustrated referring to FIGS. 1, 2, and 6 to 15.

Figure 1:
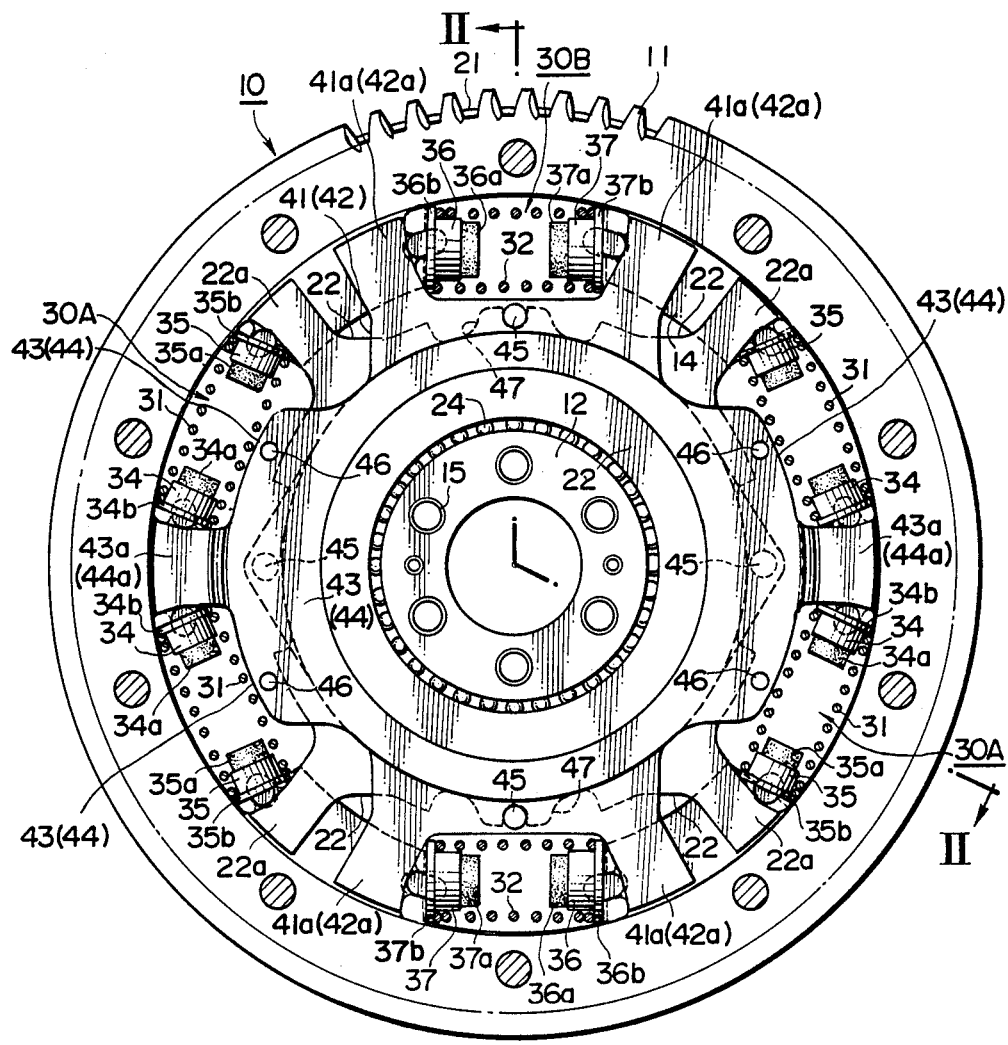
FIG 1. is an elevational view of a flywheel with a torsional damper in accordance with the first embodiment of the present invention.
Figure 2:
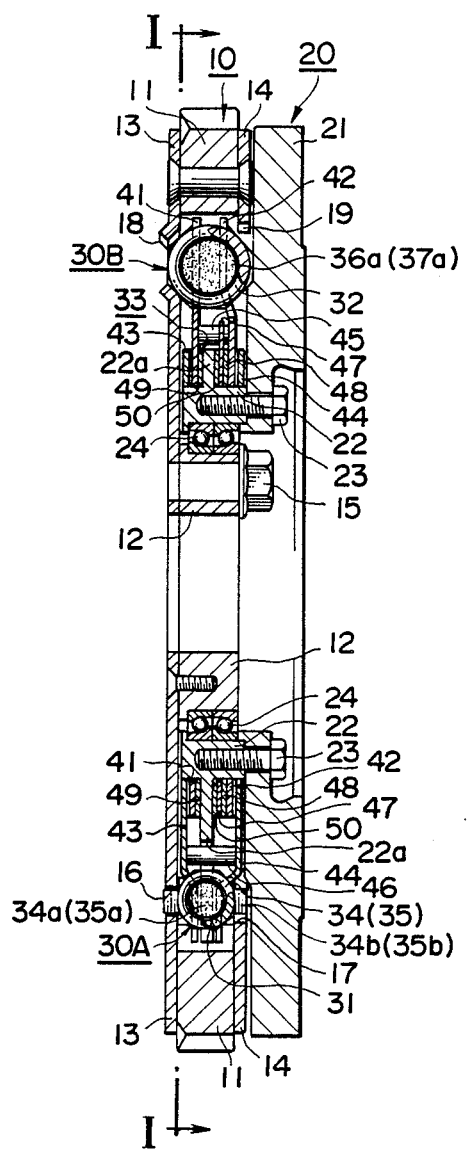
FIG. 2 is a sectional view of the flywheel of FIG. 1 taken along line II—II in FIG. 1.

As shown in FIGS. 1 and 2, the flywheel comprises a driving side flywheel 10 and a driven side flywheel 20 which have a common rotational axis and can rotate relative to each other. First and second spring mechanisms 30A and 30B are provided between driving and driven side flywheels 10 and 20. First spring mechanism 30A directly connects driving and driven side flywheels 10 and 20 and second spring mechanism 30B connects driving and driven side flywheels 10 and 20 via a friction mechanism 33 provided, in the meaning of a vibrational system, in series to second spring mechanism 30B. The series combination of second spring mechanism 30B and friction mechanism 33 is arranged, in the meaning of a spring arrangement or a vibrational system, parallel to first spring mechanism 30A.

Figure 6:
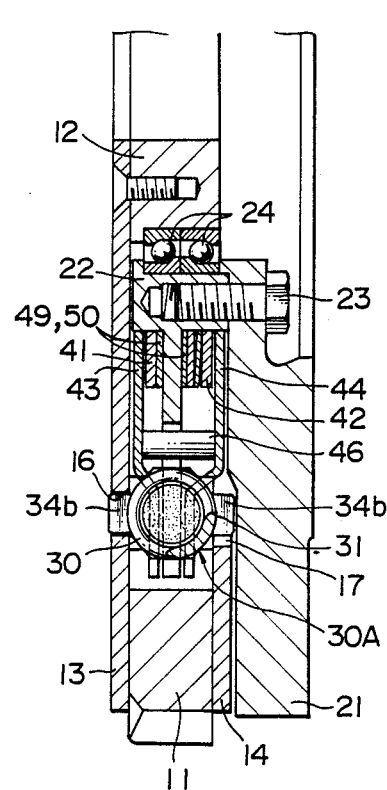
FIG. 6 is an enlarged section of a lower half portion of the section shown in FIG. 2.
Figure 7:
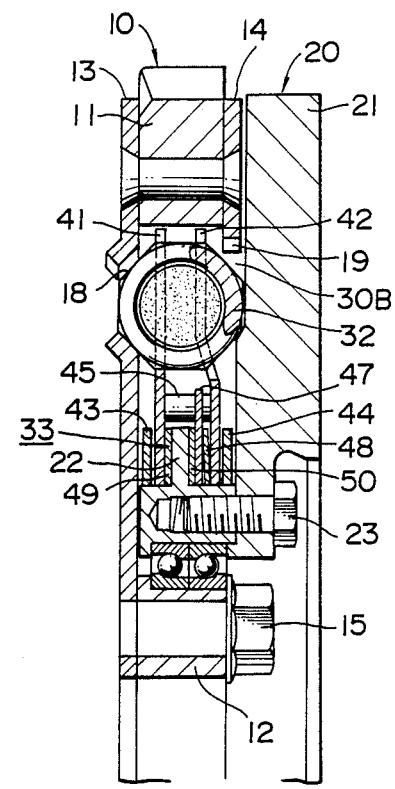
FIG. 7 is an enlarged section of an half portion of the section shown in FIG. 2.
Figure 8:
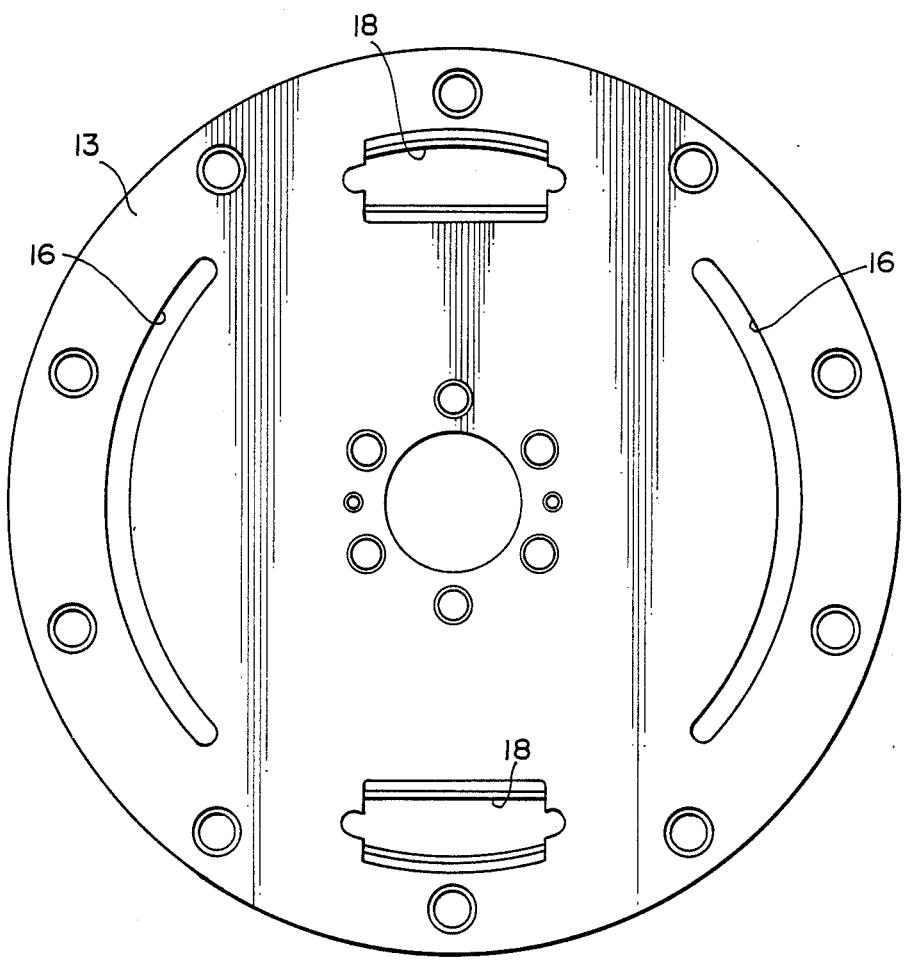
FIG. 8 is an elevational view of on a pair of driving plates used in the flywheel shown in . 1.
Figure 9:
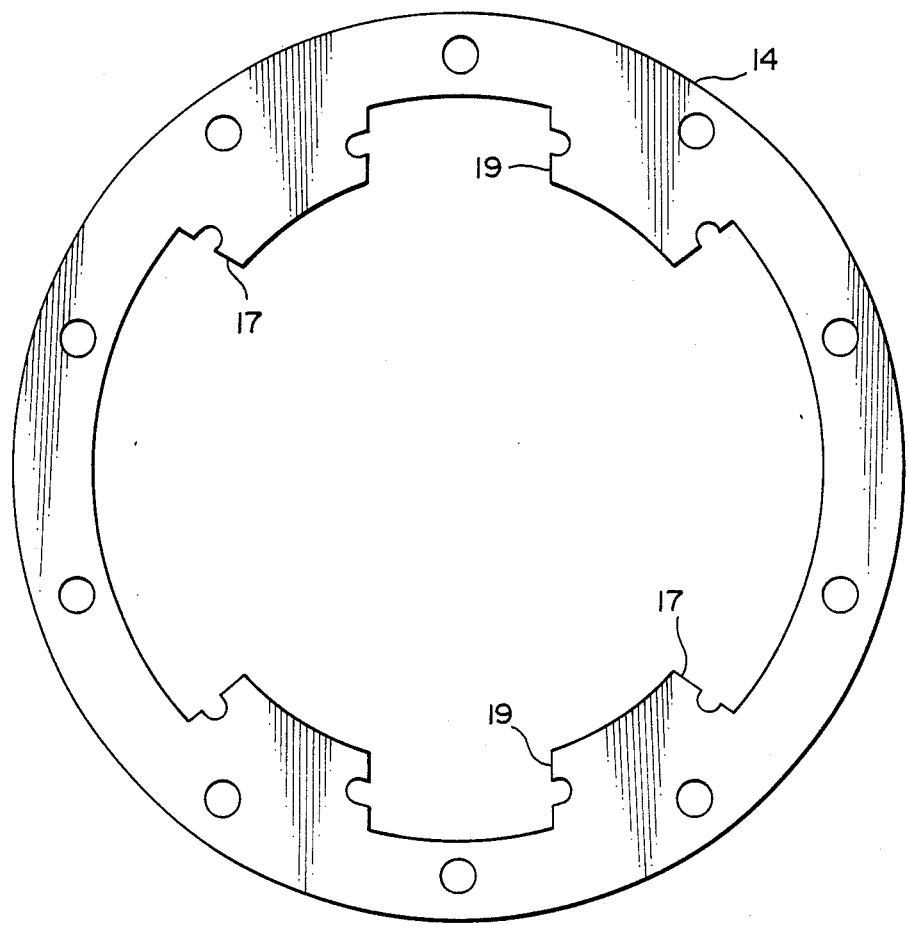
FIG. 9 is an elavational view of the other of a pair of driving plates used in the flywheel shown in FIG. 1.
Figure 10:
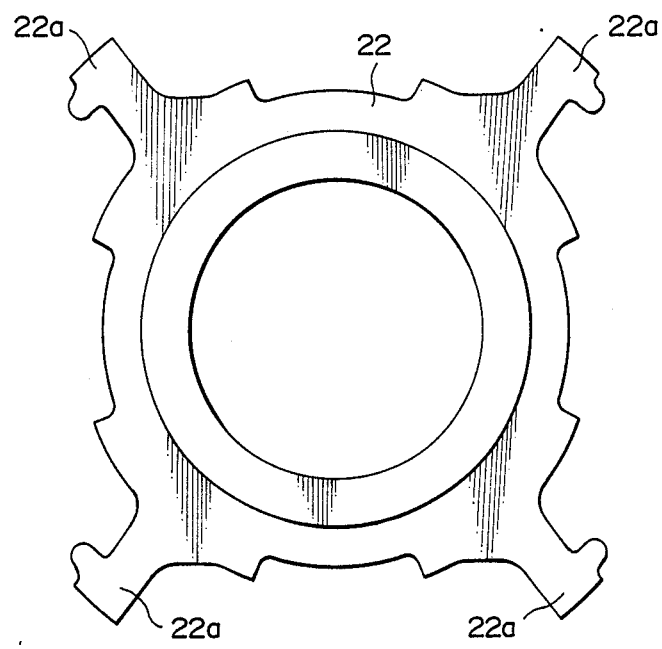
FIG. 10 is an elavational view of a driven plate used in the flywheel shown in FIG. 1.
Figure 14:
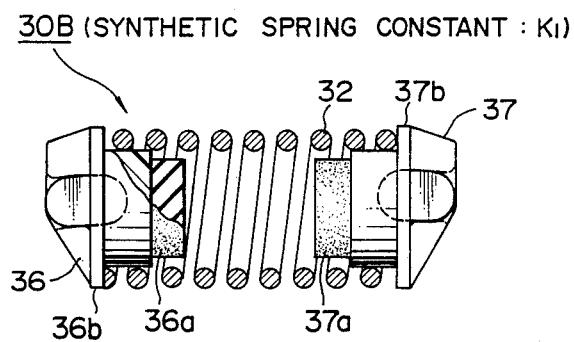
FIG. 14 is an enlarged view of a second spring mechanism used in the flywheel shown in FIG. 1 where one portion of a spring seat is shown in section.
Figure 15:
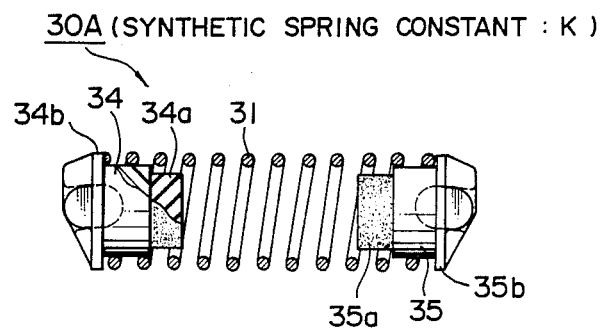
FIG. 15 is an enlarged view of a first spring mechanism used in the flywheel shown in FIG. 1 where one portion of a spring seat is shown in section.

As shown in FIGS. 1, 6 and 15 and in the lower half portion of FIG. 2, first spring mechanism 30A comprises at least one (four in the example of FIG. 1) first coil spring 31 and spring seats 34 and 35 which are disposed at both ends of each first coil spring 31 and face each other. Also, as shown in FIGS. 1, 7 and 14 and in the upper half portion of FIG. 2, second spring mechanism 30B comprises at least one (two in the example of FIG. 1) second coil spring 32 and spring seats 36 and 37 which are disclosed at ends of second coil spring 32 and face each other. As shown in FIGS. 14 and 15, spring seats 36, 37, 34 and 35 comprise a seat portion 36b, 37b, 34b, and 35b, respectively, constructed of hard synthetic resin and a cushion 36a, 37a, 34a and 35a, respectively, constructed of rubber. When the coil spring disposed between the opposed spring seats is excessively compressed and the opposing cushions are brought into contact with each other, the spring constant of the system becomes conspicuously large as shown by a curve D in FIG. 4. The curve D draws a hysteresis characteristic due to the rubber. The spring seats provided at opposite ends of one coil spring may comprise only one cushion, that is, the cushion may be provided at either one of the two opposing spring seats.

As shown in FIGS. 1, 2, 7 and 11, the flywheel further comprises a pair of first control plates 41 and 42, fixed to each other by means of rivets 45, which are rotatable relative to driving and driven side flywheels 10 and 20. First control plates 41 and 42 are provided between second spring mechanism 30B and friction mechanism 33 such that second spring mechanism 30B and friction mechanism 33 are connected via first control plates 41 and 42. First control plates 41 and 42 include arms 41a and 42a, respectively, extending radially outward and arms 41a and 42a detachably contact second spring 30B. Friction mechanism 33 slidably contacts annular portions of first control plates 41 and 42.

As shown in FIGS. 1, 2, 6 and 12, the flywheel further comprises a pair of second control plates 43 and 44, fixed to each other via rivets 46, which are rotatable relative to driving and driven side flywheels 10 and 20. First spring mechanism 30A comprises a plurality of first coil springs 31 arranged in series to each other in the circumferential direction of the flywheel. Second control plates 43 and 44 include a plurality of arms 43 and 44a, respectively, and two adjacent first coil springs 31 are connected via arms 43a and 44a of second control plates 43 and 44. Second control plates 43 and 44 function only to connect two adjacent first coil springs 31.

As shown in FIGS. 1, 2, 6, 7, 8 and 9 driving side flywheel 10 comprises an outer ring 11 which functions also as a ring gear, an inner ring 12 disposed radially inside of and spaced from outer ring 11, and a pair of driving plates 13 and 14 disposed on both sides of outer ring 11. Outer ring 11 is fixedly squeezed between paired driving plates 13 and 14 by pins. Inner ring 12 is fixed to one of driving plates 13 and 14. Inner ring 12 and driving plate 13 are fixed to a crank shaft of an engine by bolts 15. Driving plate 13 includes a circumferentially prolonged opening 18 for detachably engaging second spring mechanism 30B and a circumferentially prolonged opening 16 for detachably engaging first spring mechanism 30A. Also, driving plate 14 includes a circumferentially prolonged slot 19 for detachably engaging second spring mechanism 30B and a circumferentially prolonged slot 17 for detachably engaging first spring mechanism 30A. Slots 19 and 17 may be formed of openings formed in the driving plate.

As shown in FIGS. 1, 2, 6, 7 and 10, driven side flywheel 20 comprises a flywheel body 21 and a driven plate 22 fixed to flywheel body 21 by bolts 23. Driven side flywheel 20 is rotatably supported by driving side flywheel 10 via a bearing 24 at driven plate 22. Driven plate 22 includes an arm 22a for detachably engaging first spring mechanism 30A.

Figure 13:
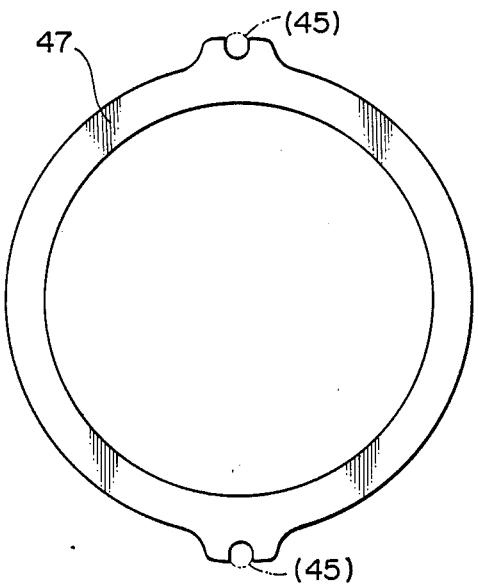
FIG. 13 is an elevational view of a thrust plate used in a friction mechanism of the flywheel shown in FIG. 1.
Figure 11:
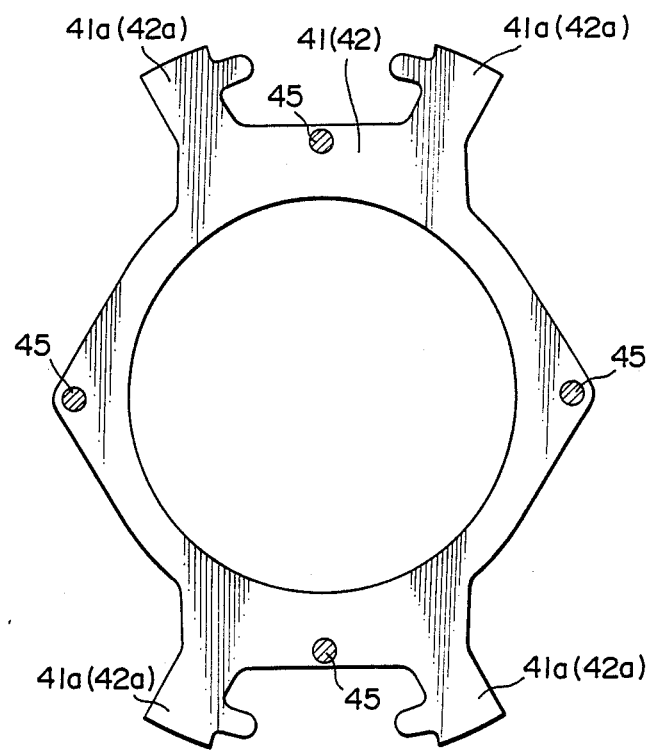
FIG. 11 is an elevational view of a first control plate used in the flywheel shown in FIG. 1.
Figure 12:
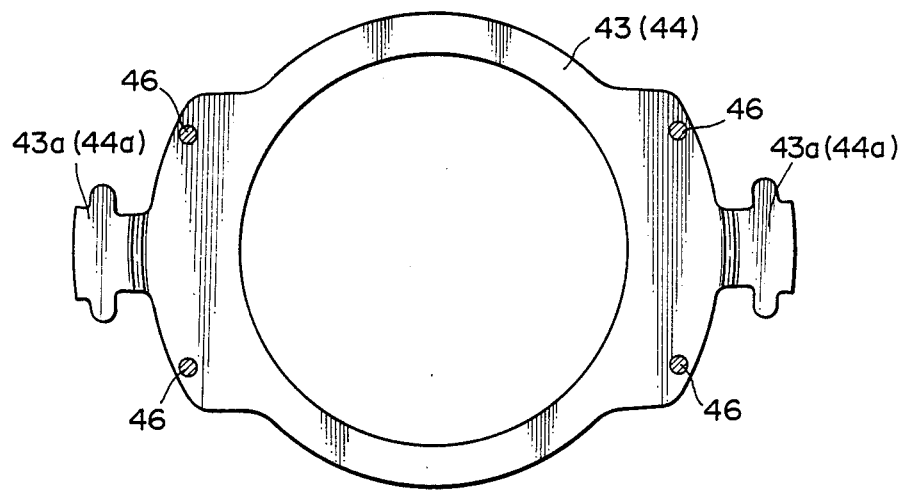
FIG. 12 is an elevational view of a second control plate used in the flywheel shown in FIG. 1.

As shown in FIGS. 1, 2, 6, 7 and 13, friction mechanism 33 comprises a thrust linings 49 and 50 constructed of an abrasive material, a thrust plate 47 comprising a substantially annular plate as shown in FIG. 13, and a cone spring 48 for producing a specified axial torce for defining the specified friction force Fr. These members 49, 50, 47 and 48 are disposed, in the axial direction of the flywheel, between the pair of first control plates 41 and 42 and the annular portion of driven plate 22. As shown in FIG. 13, thrust plate 47 engages pin 45 connecting first control plates 41 and 42 so that thrust plate 47 rotates together with first control plates 41 and Operation and effects of the flywheel of the first embodiment were already explained referring to FIGS. 3, 4 and 5.

Next, the second embodiment of the present invention will be explained referring to FIGS. 16 and 17. The second embodiment relates to an improvement of the first embodiment. In the first embodiment, when excessively large torques act on the friction mechanism 33, the friction mechanism 33 will slide even if the rotational speed of the engine is in the ranges A and E of FIG. 5. Due to this sliding, the maximum torque capacity of the flywheel of the first embodiment will be limited in some cases. The object of the second embodiment, that is, the second object of the present invention is to raise the torque capacity of the flywheel.

In the second embodiment, a stopper mechanism 60 is provided between first control plates 41 and 42 and driven plate 22 of driven side flywheel 20. The stopper mechanism 60 is shown in FIG. 16. The stopper mechanism 60 comprises a pin 45 connecting first control plates 41 and 42 and shoulders 22b and 22b formed in driven plate 22 which are spaced from pin 45 by a specified distance in the circumferential direction of the flywheel. When a torsional angle induced between driven plate 22 and first control plates 41 and 42 exceeds the angle corresponding to the specified circumferential distance, pin 45 strikes either one of shoulders 22b , thereby restricting further mutual rotation and further sliding at friction mechanism 33 At point Q of FIG. 4, pin 45 strikes either one of shoulders 22b. FIG. 17 illustrates a vibrational system of the second embodiment which is obtained by adding the stopper mechanism 60 to the vibrational system of the first embodiment shown in FIG. 3. The addition of the stopper mechanism 60 increases the capacity of torque transmitting of the flywheel. Other structures, functions and effects of the flywheel in accordance with the second embodiment are the same as those of the flywheel proposed in the first embodiment.

FIGS. 18 and 19 illustrate the third embodiment of the present invention. The third embodiment relates to an improvement of the first embodiment. In the first embodiment, if the first control plates 41 and 42 or the second control plates 43 and 44 contact the outer ring 11, rotation of first control plates 41 and 42 or second control plates 43 and 44 will temporarily stick with driving side flywheel 10, and the damping effect of the flywheel will be disrupted. The object of the second embodiment is to provide clearance relationships which are preferable to be provided in the flywheel.

In FIG. 18, a clearance SA denotes a radial clearance existing between a radially outer edge of spring seat 34 and a radially inside surface of outer ring 11. A clearance SB denotes a radial clearance existing between radially inside surfaces of second control plates 43 and 44 and a radially outside surface of an annular portion of driven plate 22. Also, a clearance SC denotes a radial clearance existing between radially outer edges of arms 43a and 44a of second control plates 43 and 44 and the radially inside surface of outer ring 11. Among these clearances SA, SB and SC, the following dimensional relationships hold:

0 <SA <SC, and
0 <SA <SB.

When unbalancing forces act on second control plates 43 and 44 from both sides, the above dimensional relationships prevent second control plates 43 and 44 from contacting outer ring 11, thereby preventing a temporary sticking and wear to the abrasion and maintaining a good damping effect of the flywheel.

Also, in FIG. 19, a clearance SD denotes a radial clearance existing between radially outer edges of spring seats 36 and 37 and the radially inside surface of outer ring 11. A clearance SE denotes a radial clearance existing between radially inside surfaces of first control plates 41 and 42 and the radially outside surface of the annular portion of driven plate 22. A clearance SF denotes a radial clearance existing between, radially outer edges of arms 41a and 42a of first control plate 41 and 42 and the radially inside surface of outer ring 11. Among these clearances SD, SE and SF, the following dimensional relationships hold:

0 <SD<SF, and
0 <SD<SE.

When unbalancing forces act on first control plate 41 and 42 from both sides, the above dimensional relationships prevent first control plates 41 and 42 from contacting outer ring 11, thereby preventing sticking and wearing due to the abrasion and maintaining a good damping effect of the flywheel.

FIGS. 20 to 23 illustrate the fourth embodiment of the present invention. The fourth embodiment relates to an improvement of the first embodiment. In the first embodiment, when the flywheel with a torsional damper is designed for a high torque flywheel, the first and second spring mechanisms 30A and 30B are required to be designed so as to have a large spring constant, whereby a damping effect of the flywheel is decreased. In some cases, the resonance speed of the K+K₁ characteristic with a large spring constant is difficult to be set at a speed lower than the usual operating range of the engine. This means that the damping effect in the usual operating range is disrupted. of the resonance speed of the K+K₁ characteristic exists in the usual operating range, the friction mechanism will cause sliding very frequently and thrust linings 49 and 50 of friction mechanism 33 tend to be worn in a relatively short time. The fourth embodiment raises the torque capacity of the flywheel of the first embodiment.

Figure 20:
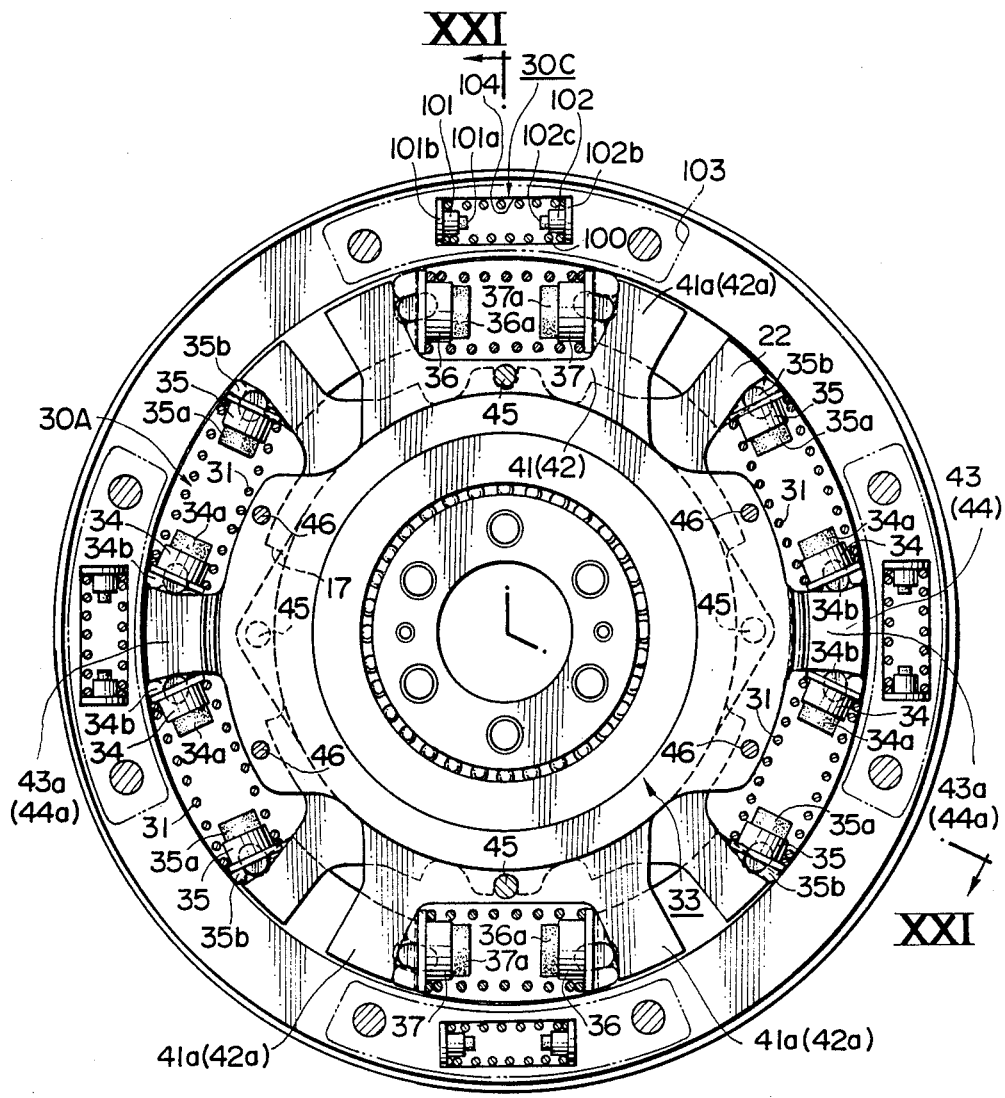
FIG. 20 is an elevational view of a flywheel according to the fourth embodiment of the present invention illustrating how a third spring mechanism is provided in the flywheel of FIG. 1.
Figure 21:
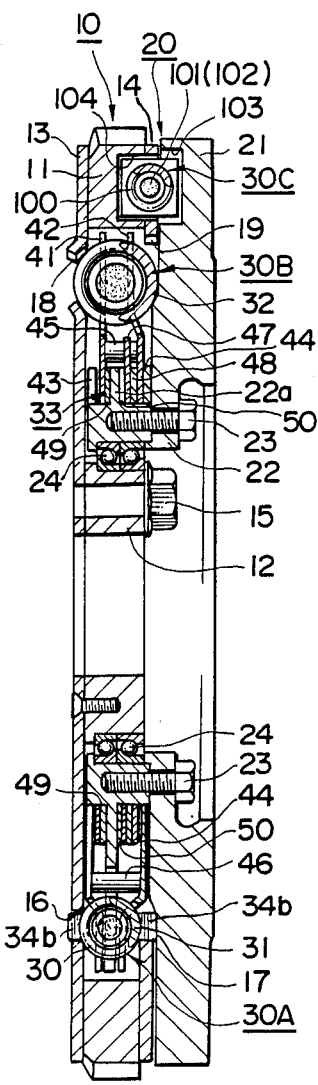
FIG. 21 is a sectional view, taken along line XXI—XXI in FIG. 20, of the flywheel according to the fourth embodiment illustrating how the third spring is provided in the flywheel of FIG. 2.
Figure 22:
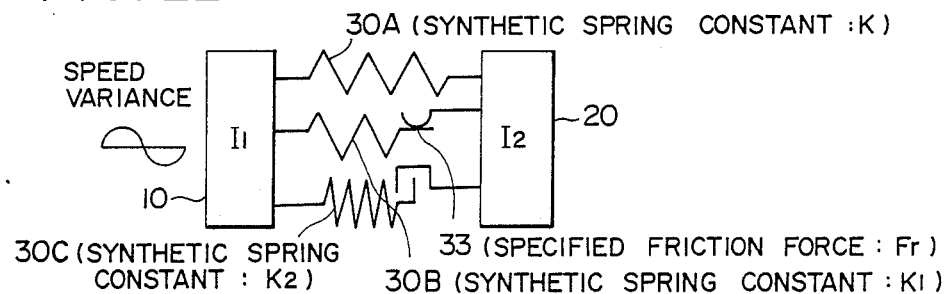
FIG. 22 is a system diagram of a system according to the fourth embodiment of the present invention illustrating how the third spring mechanism is provided.

In the fourth embodiment, a third spring mechanism 30C having a synthetic spring constant K₂ is added to the flywheel of the first embodiment as shown in FIGS. 20, 21 and 22. As shown in FIG. 22, third spring mechanism 30C is provided in parallel to first spring mechanism 30A and the series combination of second spring mechanism 30B and friction mechanism 33. Third spring mechanism 30C is provided between driving and driven side flywheels 10 and 20 and connects driving and driven side flywheels 10 and 20 with a gap which is provided in series to third spring mechanism 30C as shown in FIG. 22.

FIGS. 20 and 21 illustrate the details of third spring mechanism 30C and members existing in the vicinity of third spring mechanism 30C. As shown in FIGS. 20 and 21, third spring mechanism 30C comprises a third coil spring 100 and spring seats 101 and 102 which are disposed at both ends of third coil spring 100. Spring seats 101 and 102 comprise seat portions 101b and 102b, respectively, which are constructed of hard synthetic resin and cushions 101a and 102a, respectively, which are constructed of rubber and face each other. The cushion may be provided at either one of spring seats 101 and 102. Driving plate 14 and outer ring 11 have a circumferentially prolonged groove 104 for housing a portion of third spring mechanism 30C. Both ends of third spring mechanism 30C detachably engage circumferential end walls of groove 104. Flywheel body 21 has a circumferentially prolonged groove 103 which is formed longer than groove 104 in the circumferential direction of the flywheel and opposes groove 104 in the axial direction of the flywheel. Gaps are provided between both, ends of third spring mechanism 30C and circumferential end walls of groove 103. Other structures of the fourth embodiment are the same as those of the first embodiment.

Figure 23:
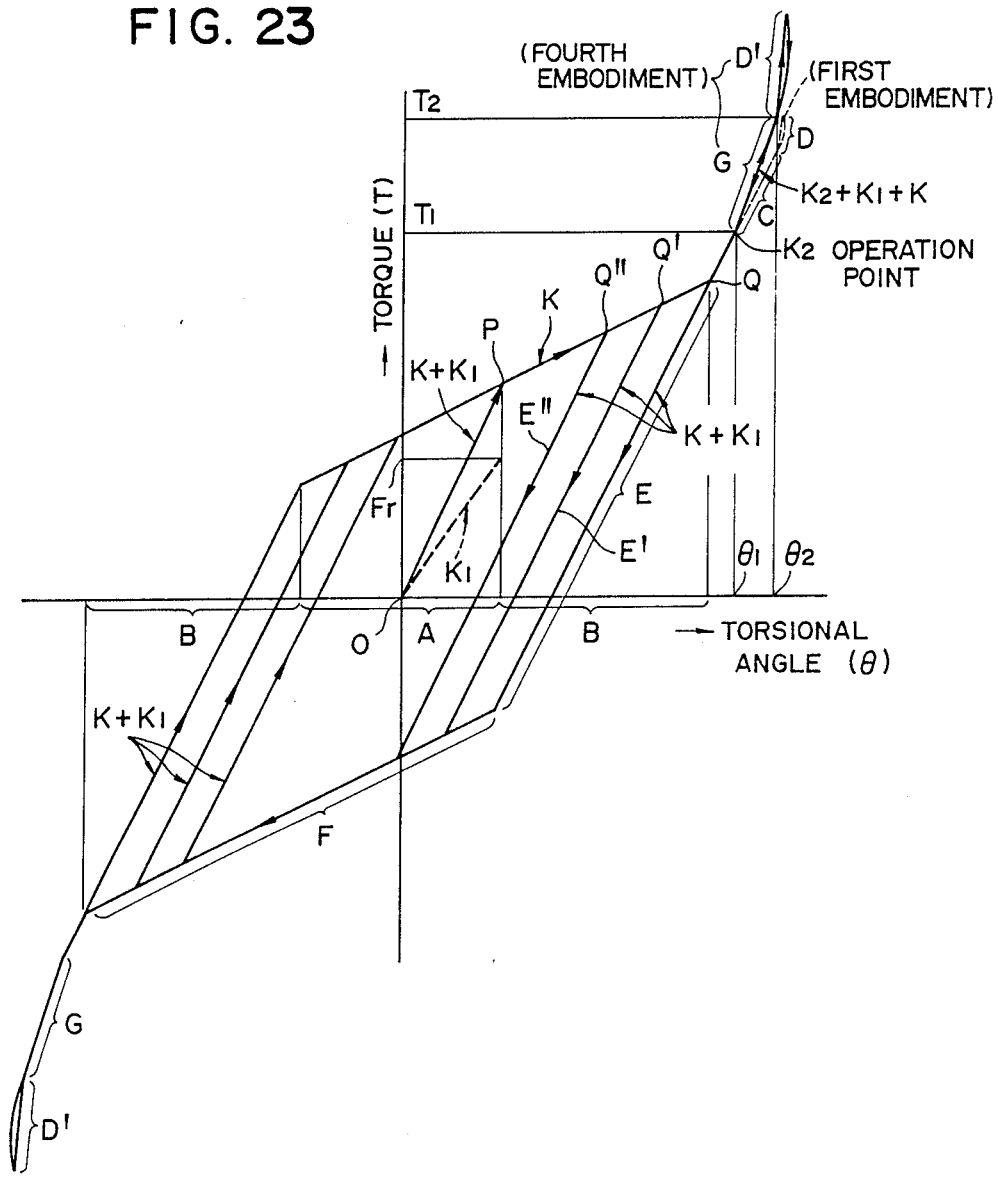
FIG. 23 is a diagram illustrating a torsional angle-torque characteristic of the fourth embodiment of the present invention and illustrating how the third spring mechanism operates.

FIG. 23 illustrates relationships existing between a torsional angle and a torque in the flywheel of the fourth embodiment. As shown in FIG. 23, the gap provided between third spring mechanism 30C and groove 103 is determined such that third spring mechanism 30C begins its operation at a torque higher than the torque obtained at the point Q in FIG. 23 which corresponds to point Q of FIG. 4. Point Q of FIG. 4 is a point where friction mechanism 33 ceases sliding by means of stopper mechanism 60 explained in the second embodiment. In FIG. 23, in a characteristic G defined between the torques $T_1$ and $T_2$ and between the torsional angles $\theta_1$ and $\theta_2$, all spring mechanisms 30A, 30B and 30C operate and a hard spring constant can be obtained. The range D' illustrates the characteristic where the cushions of all spring mechanisms 30A, 30B and 30C operate. In FIG. 23, dotted lines C and D illustrate the characteristic of the first embodiment for comparison.

Due to the provision of third spring mechanism 30C, a torque capacity of the flywheel is raised. Also, it becomes possible to use a coil spring having a low spring constant for a coil spring of first and second spring mechanisms 30A and 30B, whereby a good damping characteristic can be obtained. Further, it becomes possible to use commonly designed first and second spring mechanisms 30A and 30B for different models of flywheels for various engines by accommodating only third spring mechanism 30C so as to match the requirements of the various engines, thereby decreasing designing and manufacturing costs. Furthermore, due to the disposition of third spring mechanism 30C provided at outer ring 11 of drive side flywheel 10 and at flywheel body 21 of driven side flywheel 20, torque transmittance through third spring mechanism 30C does not impose any load on the control plates, thereby increasing durability of the flywheel.

Figure 25:
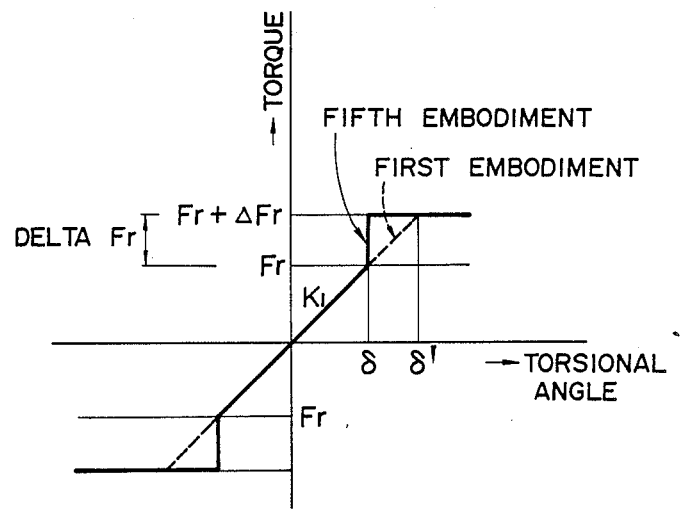
FIG. 25 is a partial diagram of a torsional angle-torque characteristic of the fifth embodiment for illustrating a variance of a specified friction force due to abrasion of a thrust lining used in a friction mechanism, in which a variance in the characteristic according to the first embodiment is also shown for comparison.
Figure 27:
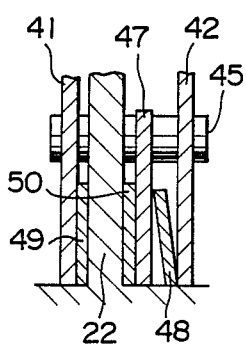
FIG. 27 is an enlarged view of a friction mechanism of the flywheel according to the fifth embodiment which also illustrates the friction mechanism of the first embodiment.
Figure 28:
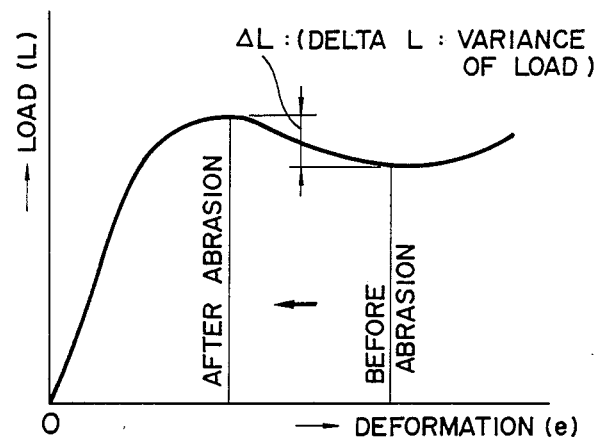
FIG. 28 is a diagram illustrating a deformation-load characteristic of a cone spring used in the friction mechanisms of the fifth and first embodiments.
Figure 29:
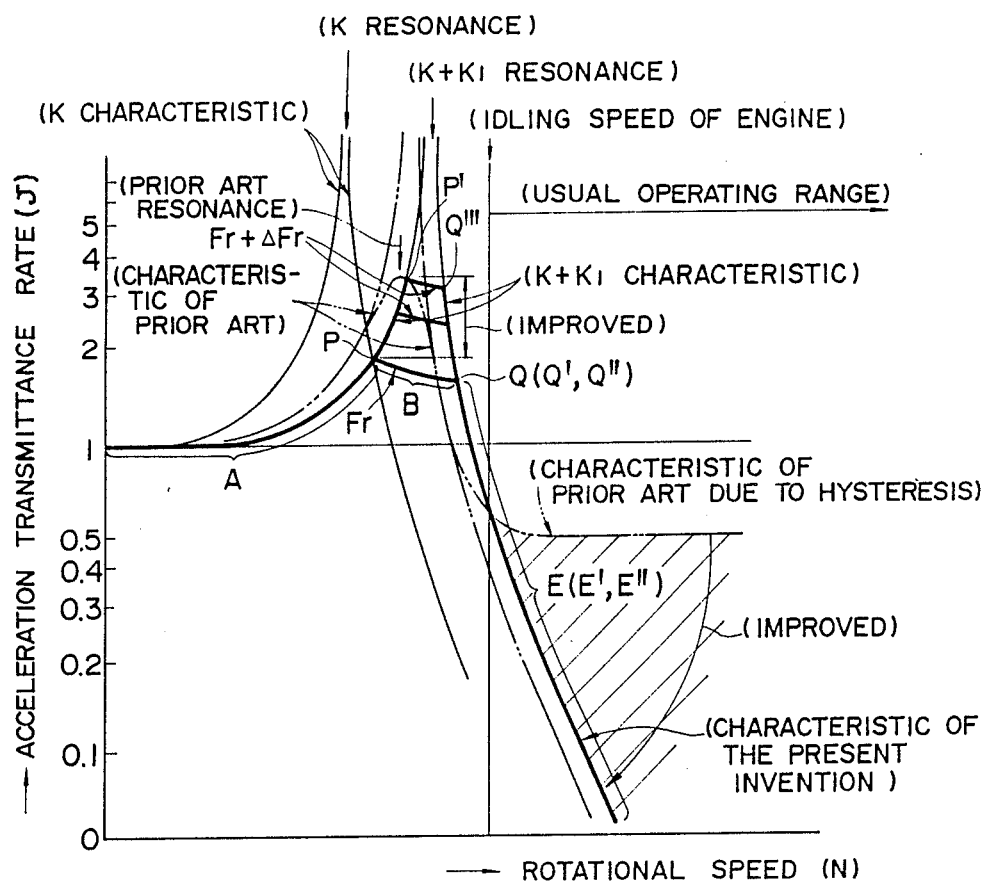
FIG. 29 is a graph illustrating a rotational speed-acceleration transmittance rate characteristic of the flywheel according to the fifth embodiment, illustrating also how a B-curve of the first embodiment is raised-up corresponding to the abrasion of the thrust lining.

FIGS. 24 to 29 illustrate the fifth embodiment and portions to be improved of the first embodiment. The fifth embodiment relates to an improvement of the first embodiment. The first embodiment includes the following two points to be improved from the view point of variance in the specified friction force:

First, in FIG. 27 which illustrates an enlarged section of friction mechanism 33 of the first embodiment, when thrust linings 49 and 50 constructed of an abrasive material are worn, cone spring 48 is relaxed in the axial direction and therefore a compression deformation of cone spring 48 becomes small. Cone spring 48 usually has a deformation(e)-load(L) characteristic as shown in FIG. 28. Therefore, when thrust linings 49 and 50 are worn, load L produced by cone spring 48 will increase by delta L as shown in FIG. 28 and the specified friction force Fr of friction mechanism 33 increases by delta Fr as shown in FIG. 25 by a dotted line which corresponds to the first embodiment. When the specified friction force Fr varies by delta Fr, the shift curve B (see FIG. 5) of the first embodiment will be raised upward as shown by a curve connecting points P' and Q'' in FIG. 29 and therefore the damping effect around the resonance speed of the $K+K_1$ characteristic will be degraded.

Figure 26:
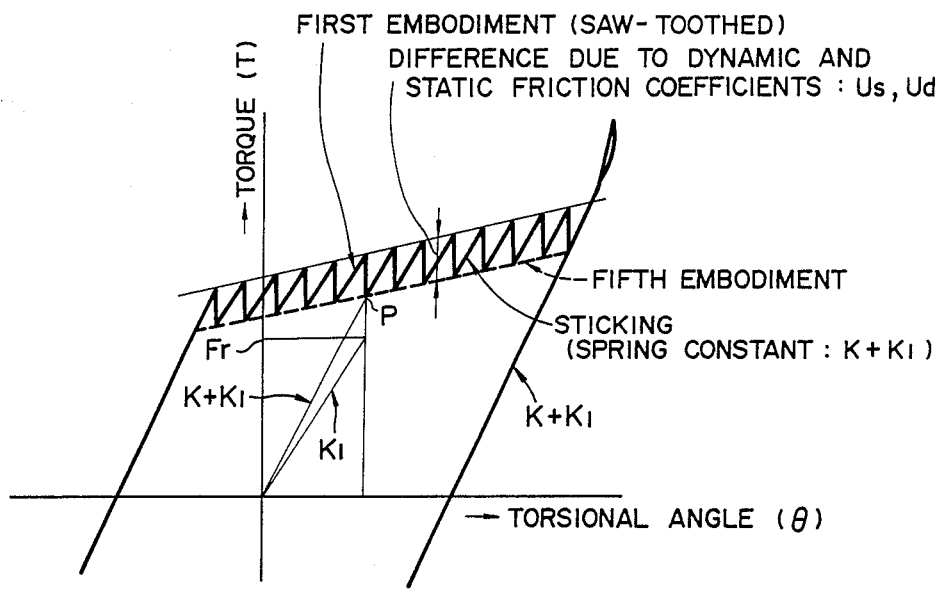
FIG. 26 is another partial diagram of a torsional angle-torque characteristic of the fifth embodiment for illustrating a suppressed deviation of a specified friction force due to differences existing between dynamic and static friction coefficients of an abrasive material used in the friction mechanism, in which a deviation occurring in the flywheel of the first embodiment is also shown comparison.

Second, when friction mechanism 33 slides in the first embodiment, if such/a material, as has dynamic and static friction coefficients different from each other to a great extent is used for thrust linings 49 and 50, the K characteristic of FIG. 4 will become a saw-toothed line as shown in FIG. 26 due to momentarily sticking at thrust linings 49 and 50. The obliquely extending line elements of the saw-toothed line correspond to sticking at thrust linings 49 and 50 and have the same inclination as that of the $K+K_1$ characteristic, thereby degrading the damping effect of the system as it passes through the resonance speed of the $K+K_1$ characteristic.

Figure 24:
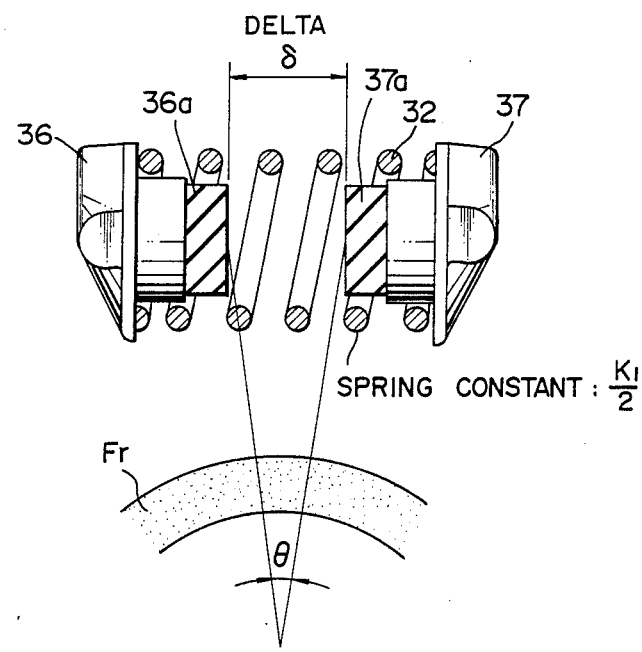
FIG. 24 is a schematic view of spring seats disposed at both ends of a second coil spring of a second spring mechanism and a friction mechanism in accordance with the fifth embodiment of the present invention.

The object of the fifth embodiment is to solve the above points to be improved over the first embodiment. In the fifth embodiment, as shown in FIG. 24, a distance delta provided between the opposing cushions 36a and 36b of the two spring seats 36 and 37 which are disposed at both ends of each second coil spring 32 of second spring mechanism 30B is determined such that, when a force acting on friction mechanism 33 due to a deformation of second spring mechanism 30B having the spring constant $K_1$ becomes equal to the specified friction force Fr which is initially given to the friction mechanism 33, the opposing cushions 36a and 36b just begin their contact so as to make the friction mechanism positively slide.

In the flywheel of the fifth embodiment, despite a variance of the force Fr due to an abrasion of thrust linings 49 and 50, friction mechanism 33 always begins its sliding at a constant torsional angle as shown in FIG. 25 by a full line. As a result, shift of the operation is always performed through curve B of FIG. 29, that is, not through a raised-up curve connecting the points P' and Q''. Also, a torsional angle $\theta$ - torque T characteristic becomes a dotted line shown in FIG. 26 without being accompanied by a sticking due to a difference in the dynamic and static friction coefficients of the abrasive material, that is, unlike the saw-toothed line of the first embodiment.

According to the fifth embodiment, the following effects are obtained. First, friction mechanism 33 can begin sliding at a substantially constant torsional angle despite abrasion of thrust linings 49 and 50 and, as a result, an acceleration transmittance rate during passing through the resonance speed of $K+K_1$ characteristics is always maintained at a low level. Second, operation of the system during sliding of friction mechanism 33 is stabilized despite a difference existing between the dynamic and static friction coefficients of thrust linings 49 and 50. This also enables the possibility of using an abrasive material having a large difference between dynamic and static friction coefficients thereof and will decrease cost.

FIGS. 30 and 31 illustrate the sixth embodiment of the present invention. The sixth embodiment relates to an improvement of the first embodiment.

In the first embodiment, the cushions of all the spring seats of the first and second spring mechanisms 30A and 30B are set to strike the opposing cushions at the same time according to the provision of stopper mechanism 60 which is explained in the second embodiment. Therefore, a torque $T_1'$ which first control plates 41 and 42 receive is a sum of a torque $TK_1$ due to a deformation of second coil springs 32 of second spring mechanism 30B and a torque $T_c$ due to a deformation of the cushions, while a torque $T_2$, which driven plate 22 receives is a sum of a torque $T_K$ due to a deformation of first coil springs 31 of first spring mechanism 30A and a torque $T_c$ due to a deformation of the cushions. The dotted lines of FIG. 30 illustrate the torques imposed on first control plates 41 and 42 and driven plate 22 in the first embodiment. A ratio of $N=K_1/K$ is set to become large to suppress vibration amplitudes as the system passes through the resonance speed of the $K+K_1$ characteristic. Therefore, $T_{1'}$ becomes larger than $T_{2'}$. This means that a torque imposed on first control plates 41 and 42 is larger than that of driven plate 22 and therefore an optimized strength design is not performed in the first embodiment.

In the sixth embodiment, a torque load acting in the flywheel at the time after stopper mechanism 60 explained in the second embodiment acts is distributed to first control plates 41 and 42 and driven plate 22, respectively, in proportion to respective strengths of the control plates and the driven plate. In more detail, a torque $T_1$ which first control plates 41 and 42 receive is a sum of a torque $TK_1$ induced due to a deformation of a plurality of second coil springs of second spring mechanism 30B and a torque $T_{CK1}$ induced due to a deformation of the cushions. Therefore, the following relationships hold:

$$T_1 = TK_1 + T_{CK1} = K_1\theta_1 + K_{C1}\theta C_1$$

where:

$K_1$ is a synthetic spring constant of second spring mechanism 30B;

$KC_1$ is a synthetic spring constant of the cushions;

$\theta_1$ is a deformation of second spring mechanism 30B; and $\theta C_1$ is a deformation of the cushions.

Similarly, a torque $T_2$, which driven plate 22 receives, is a sum of a torque $T_K$ induced due to a deformation of first coil springs 31 of first spring mechanism 30A and a torque $T_{CK}$ induced due to a deformation of the cushions. Therefore, the following relationships hold:

$$T_2 = T_K + T_{CK} = K\theta + K_C\theta C$$

where:

K is a synthetic spring constant of first spring mechanism 30A;

$K_C$ is a synthetic spring constant of the cushions;
$\theta$ is a deformation of first spring mechanism 30A;
$\theta_C$ C is a deformation of the cushions.

When an allowable torque of arms $41_a$ and $42_a$ of first control plates 41 and 42 is $TA_1$ and an allowable torque of arm $22_a$ of driven plate 22 is $TA_2$, the following relationship is provided in the members:

$$T_1T_2 = TA_1TA_2$$

FIG. 31 illustrates the above relationships in torsional angle-torque characteristics.

The above relationship can be achieved by selecting the values of $K_C$, $K_{C1}$, $\theta_C$ and $\theta_{C1}$ which are independent of the basic damping characteristics.

Due to the sixth embodiment, an allowable torque of the flywheel can be set at its maximum. In addition, the optimization of strength of the flywheel can be achieved by selecting the length of the cushions and/or the hardness of the cushions without being accompanied by necessity of provision of any new member. Also, the optimization of strength of the flywheel can be attained by selecting a torsional angle where the opposed spring seats are brought into contact with each other.

Although only several embodiments of the present invention have been described above in detail, it will be appreciated by those skilled in the art that various modifications and alterations can be made to the particular embodiments shown without materially departing from novel teachings and advantages of the present invention. Accordingly, it is to be understood that all such modifications and alterations are included within the scope of the invention as defined by the following claims.

We claim:

1. A flywheel with a torsional damper comprising:
   two means for defining inertia moments;
   a first spring mechanism directly connecting said two inertia moment defining means;
   a second spring mechanism; and
   a friction mechanism, said friction mechanism being provided in series with said second spring mechanism, said series combination of said second spring mechanism and said friction mechanism being arranged parallel to said first spring mechanism between said two inertia moment defining means.

2. The vibrational system according to claim 1, wherein a ration ($K_1/K$) of a synthetic spring constant ($K_1$) of said second spring mechanism with respect to a synthetic spring constant (K) of said first spring mechanism is et at 3-4.

3. A flywheel with a torsional damper comprising:
   a driving side flywheel and a driven side flywheel which have a common rotational axis and can rotate relative to each other;
   a first spring mechanism directly connecting said driving and driven side flywheels and having a first spring constant, K;
   a second spring mechanism having a second spring constant, $K_1$; and
   a friction mechanism, said friction mechanism being provided in series with said second spring mechanism, said series combination of said second spring mechanism and said friction mechanism being arranged parallel to said first spring mechanism between said driving and driven side flywheels, wherein said flywheel has a $K+K_1$ vibrational characteristic, having a first resonance point and having a first spring constant determined by both said first and second spring mechanisms, and has a K vibrational characteristic, having a second resonance point, different from the first resonance point, and having a second spring constant, smaller than the first spring constant, determined by the first spring mechanism, the flywheel changing, with a momentary sliding of the friction mechanism, from the $K+K_1$ characteristic to the K characteristic while a rotational speed of the flywheel approaches the first resonance point of the $K+K_1$ characteristic.

4. The flywheel according to claim 3, wherein said first spring mechanism comprises at least one first coil spring and spring seats which are disposed at opposite ends of said first coil spring, facing each other, and said second spring mechanism comprises at least one second coil spring and spring seats which are disposed at opposite ends of said second coil spring, facing each other.

5. The flywheel according to claim 4, wherein said spring seats comprise seat portions constructed of hard synthetic resin and cushions constructed of rubber which are provided at least one of said spring seats disposed at opposite ends of said first or second coil spring.

6. The flywheel according to claim 4, wherein said first spring mechanism includes four first coil springs and said second spring mechanism includes two second coil springs.

7. The flywheel according to claim 3, further comprising a first control plate, rotatable relative to said driving and driven side flywheels and provided between said second spring mechanism and said direction mechanism such that said first control plate connects said second spring mechanism and said friction mechanism comprises:

8. The flywheel according to claim 7, wherein said first control plate comprises an annular portion and a plurality of arms which extend radially outward from said annular portion said first control plate detachably site engaging said second spring mechanism at the arms and slidably engaging said friction mechanism at the annular portion.

9. The flywheel according to claim 3, further comprising a second control plate which is rotatable relative to said driving and driven side flywheels, said first spring mechanism comprising a plurality of first coil springs arranged in a circumferential direction of the flywheel, said second control plate connecting adjacent two of said first coil springs.

10. The flywheel according to claim 9, wherein said second control plate comprises an annular portion and a plurality of arms which extend a radially outward from said annular portion, said second control plate connecting adjacent two coil springs of said first coil springs at the arms.

11. The flywheel according to claim 3, wherein said driving side flywheel comprise said first and second
   an outer ring including a ring gear;
   an inner ring disposed radially inside of and radially spaced from said outer ring; and
   a pair of driving plates disposed on opposite sides of said outer ring, said outer ring being squeezed between said pair of driving plates and said inner ring being fixed to one of said pair of driving plates, said pair of driving plates including means for detachably engaging said first and second spring mechanisms.

12. The flywheel according to claim 11, wherein said means for detachably engaging said first and second spring mechanisms comprise circumferentially prolonged openings formed in one of said pair of driving plates and circumferentially prolonged slots or openings formed in the other of said pair of driving plates.

13. The flywheel according to claim 3, wherein said driven side flywheel comprises:
a flywheel body; and
a driven plate fixed to said flywheel body, said driven plate comprising means for detachably engaging said first spring mechanism.

14. The flywheel according to claim 13, wherein said driven plate comprises an annular portion and a plurality of arms which extend radially outward from said annular portion said arms comprising said means for detachably engaging said first spring mechanism, and said friction mechanism slidably engaging opposite surfaces of said annular portion.

15. The flywheel according to claim 7, wherein said driven side flywheel includes a driven plate and wherein said friction mechanism comprises a thrust lining constructed of an abrasive material, a thrust plate comprising a substantially annular plate, and a cone spring for producing a specified axial force thereby producing a specified frictional force of said friction mechanism, said thrust lining, said thrust plate and said once spring being disposed, in an axial direction of the flywheel, between said first control plate and said driven plate of said driven side flywheel.

16. The flywheel according to claim 3, further comprising:
a first control plate, rotatable relative to said driving and driven side flywheels, provided between said second spring mechanism and said friction mechanism such that said first control plate connects said second spring mechanism and said friction mechanism; and
a stopper mechanism provided between said first control plate and said driven side flywheel such that said stopper mechanism prevents a torsional angle induced between said first control plate and said driven side flywheel from exceeding a predetermined specified torsional angle.

17. The flywheel according to claim 16, wherein said driven side flywheel comprises a flywheel body and a driven plate, said first control plate comprises a pair of plates which are connected by a pin, and said stopper mechanism comprises said pin connecting said pair of plates and shoulders formed in said driven plate which are spaced from said pin in a circumferential direction of the flywheel by a predetermined specified distance corresponding to said specified torsional angle.

18. The flywheel according to claim 3, further comprising a second control plate rotatable relative to said driving and driven side flywheels, and wherein said driving side flywheel comprises an outer ring, said driven side flywheel comprises a driven plate, and said first spring mechanism comprises a plurality of first coil springs and spring seats disposed at both ends of each of said first coil springs, adjacent said first coil springs being connected via said second control plate, and wherein the following relationships hold with respect to clearances among said outer ring, said driven plate, said spring seats and said second control plate:

$0 < SA < SB$; and
$0 < SA < SC$, where, SA is a radial clearance defined between said outer ring and said spring seats, SB is a radial clearance defined between said second control plate and said driven plate, and SC is a radial clearance defined between said second control plate and said outer ring.

19. The flywheel according to claim 3, further comprising a first control plate rotatable relative to said driving and driven side flywheels, and wherein said driving side flywheel comprises a driven plate, and said second spring seats disposed at opposite ends of each of said second coil springs, and wherein the following relationships hold with respect to clearances among said outer ring, said driven plate, said spring seats and said first control plate:

$0 < DS < SE$; and $0 < SD < SF$, where, SD is a radial clearance defined between said outer ring and said spring seats, SE is a radial clearance defined between first control plate and said driven plate, and SF is a radial clearance defined between first control plate and said outer ring.

20. The flywheel according to claim 3, further comprising a third spring mechanism which acts when a torsional angle induced between said driving and driven side flywheels exceeds a predetermined specified angle, said third spring mechanism being provided parallel to said first spring mechanism and parallel to the series combination of said second spring mechanism and said friction mechanism.

21. The flywheel according to claim 20, wherein said third spring mechanism comprises at least one third coil spring and spring seats which are disposed at both ends of said at least one third coil spring, said spring seats disposed at both ends of said third coil spring comprising seat portions constructed of hard synthetic resin, and at least one of said spring seats further comprising a cushion which is constructed of rubber.

22. The flywheel according to claim 20, wherein a first circumferentially extending groove is formed in said driving side flywheel and a second circumferentially extending groove which extends longer than said first circumferentially extending groove in a circumferential direction of said flywheel is formed in said driven side flywheel, said third spring mechanism being housed in said first circumferentially extending groove such that ends of said third spring mechanism detachably engage end walls of said first circumferentially extending groove and can contact either one of end walls of said second circumferentially extending groove when a torsional angle induced between said driving and driven side flywheels exceeds said specified angle.

23. The flywheel according to claim 3, wherein said second spring mechanism comprises a second coil spring and spring seats located at both ends of said second coil spring, said spring seats including seat portions constructed of hard synthetic resin and at least one of said spring seats further including a cushion constructed of rubber, said spring seats located at both ends of said second coil spring being brought into contact with each other at said at least one cushion when a force acting on said friction mechanism due to a deformation of said second coil spring reaches a predetermined specified friction force of said friction mechanism, thereby making said friction mechanism begin sliding.

24. The flywheel according to claim 16, wherein said driven side flywheel comprises a driven plate, and said second spring mechanism is provided such that a torque load produced after said stopper mechanism acts is distributed to said driven plate and said first control plate in proportion to respective strengths of said driven plate and said first control plate.

25. The flywheel according to claim 24, wherein said second spring mechanism comprises a second coil spring and spring seats which are disposed at both ends of said second coil spring and include cushions constructed of rubber, and said torque load distribution is performed by selecting a length or a hardness of said cushions.

26. The flywheel according to claim 24, wherein said torque distribution is performed by selecting a torsional angle where opposed said spring seats are brought into contact with each other.

* * * * *